(12) United States Patent
Maeda et al.

(10) Patent No.: US 12,728,539 B2
(45) Date of Patent: Sep. 8, 2026

(54) ROBOT SYSTEM, CONTROL APPARATUS OF ROBOT SYSTEM, CONTROL METHOD OF ROBOT SYSTEM, IMAGING APPARATUS, AND STORAGE MEDIUM

(71) Applicant: CANON KABUSHIKI KAISHA, Tokyo (JP)

(72) Inventors: Yasuharu Maeda, Kanagawa (JP); Manabu Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/652,644

(22) Filed: May 1, 2024

(65) Prior Publication Data

US 2024/0269857 A1 Aug. 15, 2024

Related U.S. Application Data

(63) Continuation of application No. 17/192,737, filed on Mar. 4, 2021, now Pat. No. 11,992,960, which is a continuation of application No. PCT/JP2019/031302, filed on Aug. 8, 2019.

(30) Foreign Application Priority Data

Sep. 12, 2018 (JP) ................................ 2018-170833

(51) Int. Cl.
*B25J 9/16* (2006.01)
*B25J 13/00* (2006.01)
*B25J 13/08* (2006.01)
*B65G 47/90* (2006.01)

(52) U.S. Cl.
CPC ............. *B25J 9/1697* (2013.01); *B25J 9/161* (2013.01); *B25J 9/1664* (2013.01); *B25J 13/006* (2013.01); *B25J 13/088* (2013.01); *B65G 47/905* (2013.01)

(58) Field of Classification Search
CPC ........ B25J 9/1697; B25J 9/161; B25J 9/1664; B25J 13/006; B25J 13/088; B25J 9/1671; B65G 47/905; G05B 2219/40167; G05B 2219/40323; G05B 2219/40504; G05B 2219/40515; G05B 2219/40607; G05B 2219/40611; G05B 2219/40617
USPC ................. 700/245–264; 318/568.11–568.25
See application file for complete search history.

(56) References Cited

U.S. PATENT DOCUMENTS 8,498,745 B2 * 7/2013 Umetsu .................... B25J 5/007 700/254
11,707,842 B2 * 7/2023 Ooba ..................... B25J 9/1664 700/251
2010/0092032 A1 * 4/2010 Boca ..................... B25J 9/1697 348/222.1
2012/0229620 A1 * 9/2012 Ikeda ..................... B25J 9/1692 348/94
2016/0008078 A1 * 1/2016 Azizian ................. A61B 34/20 700/255

* cited by examiner

*Primary Examiner* — Jaime Figueroa
(74) *Attorney, Agent, or Firm* — Canon U.S.A., Inc. IP Division

(57) ABSTRACT

A robot system including a robot apparatus and an imaging apparatus includes a control apparatus configured to control the robot apparatus and the imaging apparatus, and the control apparatus controls, based on a path in which a predetermined part of the robot apparatus is moved, a movement of the imaging apparatus to image the predetermined part even if the robot apparatus is moved.

35 Claims, 12 Drawing Sheets

155
2
Wc
Wd
152
154
Wa
150
153
1
P
Wb
13
60
1000
31
3

1
50
53
J4
54
J5
55
56
11
J6
J1
10
J3
52
J2
51
12
13
14
60
x
z
y 60
23
B
A
2
20
21
22

3
30
31
32
33
34
60

31
110
MANUAL OPERATION
X
Y
Z
J1
J2
J3
J4
J5
J6
111
112
AUTOMATIC OPERATION
113
114
115
100
Wa
1
120
MANUAL OPERATION
122
121
AUTOMATIC OPERATION
IMAGING TARGET
J5
J6
END EFFECTOR
FOLLOW-UP ON
124
FOLLOW-UP OFF
125
123

ROBOT SYSTEM, CONTROL APPARATUS OF ROBOT SYSTEM, CONTROL METHOD OF ROBOT SYSTEM, IMAGING APPARATUS, AND STORAGE MEDIUM

CROSS-REFERENCE TO RELATED APPLICATIONS

This application is a Continuation of U.S. patent application Ser. No. 17/192,737, filed Mar. 4, 2021, which is a Continuation of International Patent Application No. PCT/JP2019/031302, filed Aug. 8, 2019, which claims the benefit of Japanese Patent Application No. 2018-170833, filed Sep. 12, 2018, all of which are hereby incorporated by reference herein in their entirety.

BACKGROUND OF THE INVENTION

Field of the Invention

The present invention relates to a robot system.

Background Art

In recent years, work executed in a factory production line such as assembling, transportation, and painting work have been automated by a robot system in which a robot apparatus is used. A multi-joint robot using a robot arm having a plurality of rotary-drive joints and a vertical multi-joint robot using a robot arm having a plurality of horizontal-drive arm links are given as examples of the robot apparatus.

With progress in a control technique of the robot system, a desired operation command can be given to a robot apparatus from a remote location. For example, two apparatuses, a control apparatus that controls the robot apparatus and a computer operated by an operator in a remote location, are connected to a network, and the robot apparatus is displayed on a screen of the computer through an imaging apparatus, such as a network camera. In this way, the operator in the remote location can operate the robot apparatus on the computer screen.

Thus, even in a case where an abnormality has occurred in the robot apparatus in a factory and the operator has to conduct a maintenance work of the robot apparatus by visual recognition, the operator can conduct the maintenance work from the remote location by using the imaging apparatus. It is therefore possible to plan to make the factory production line not only automated but also unmanned.

The above-described unmanned factory production line can realize not only reduction of labor cost but also monitoring of a factory even in a case where entrance of an operator into the factory is not preferable because of the factory environmental, so that there is an increased demand for the unmanned factory.

To operate the robot apparatus from the remote location by visual recognition by using the imaging apparatus as described above, what is important is a viewpoint of the imaging apparatus. In the event of an abnormality in the robot apparatus as described above, in a case where the robot apparatus is caused to execute a predetermined operation in order to visually conduct a maintenance work from the remote location by visual recognition, there is a viewpoint which the operator wants to closely observe based on the operation of the robot apparatus.

For example, in a case where a robot apparatus having a robot hand mounted on a leading end of a robot arm is used to conduct a maintenance work by operation like grasping a target object with using the robot hand, the operator has to closely observe the robot hand and the workpiece.

Further, in a case where the robot arm of the robot apparatus is stopped because of occurrence of abnormality and restored to a predetermined orientation from the orientation of the stopped robot arm, a specific part of the robot arm may pass the vicinity of a nearby obstacle. In such a case, so as to urgently stop the robot arm if the specific part of the robot arm is about to be in contact with the nearby obstacle, the viewpoint of the imaging apparatus is desirably controlled to closely observe the vicinity of the specific part continuously while performing the operation to restore the robot arm.

In PTL 1, a method is discussed in which follow-up control of an imaging apparatus can be easily executed by detecting a movement trajectory of a target object to be closely observed by the imaging apparatus from a video image captured by the imaging apparatus.

CITATION LIST

Patent Literature

PTL 1: Japanese Patent Application Laid-Open No. 2016-111649

The technique discussed in PTL 1 allows the viewpoint of the imaging apparatus to be controlled to follow a target object by executing processing (image matching) for detecting a target object position in the video image imaged by the imaging apparatus. Therefore, in a case where the viewpoint of the imaging apparatus is to be controlled to follow the movement of the robot apparatus, a plurality of follow-up markers needs to be provided on respective parts of the robot. In many cases, various peripheral devices are installed in a robot apparatus used in a factory, so that it will be difficult to execute follow-up control of the viewpoint of the imaging apparatus if the follow-up markers are hidden behind the other peripheral devices.

SUMMARY OF THE INVENTION

In consideration of the above issue, the present invention is directed to a robot system capable of controlling a viewpoint of an imaging apparatus without using follow-up markers when a robot apparatus in which peripheral devices are installed is operated based on imaging executed by the imaging apparatus.

In order to solve the above-described issue, the present invention employs a robot system including a robot apparatus and an imaging apparatus. The robot system includes a control apparatus configured to control the robot apparatus and the imaging apparatus, and the control apparatus controls, based on a path in which a predetermined part of the robot apparatus is moved, a movement of the imaging apparatus to image the predetermined part even if the robot apparatus is moved.

Further features of the present invention will become apparent from the following description of exemplary embodiments with reference to the attached drawings.

BRIEF DESCRIPTION OF THE DRAWINGS

FIG. 10 is a diagram illustrating a configuration of an imaging apparatus 4 according to an exemplary embodiment.

DESCRIPTION OF THE EMBODIMENTS

Hereinafter, exemplary embodiments embodying the present invention will be described with reference to the appended drawings. The exemplary embodiments described hereinafter are merely examples, and details of the configuration can be appropriately changed by those skilled in the art within a range which does not depart from the scope of the present invention. Further, a value mentioned in the present exemplary embodiment is a reference value, and is not intended to limit the present invention.

First Exemplary Embodiment

Figure 1:
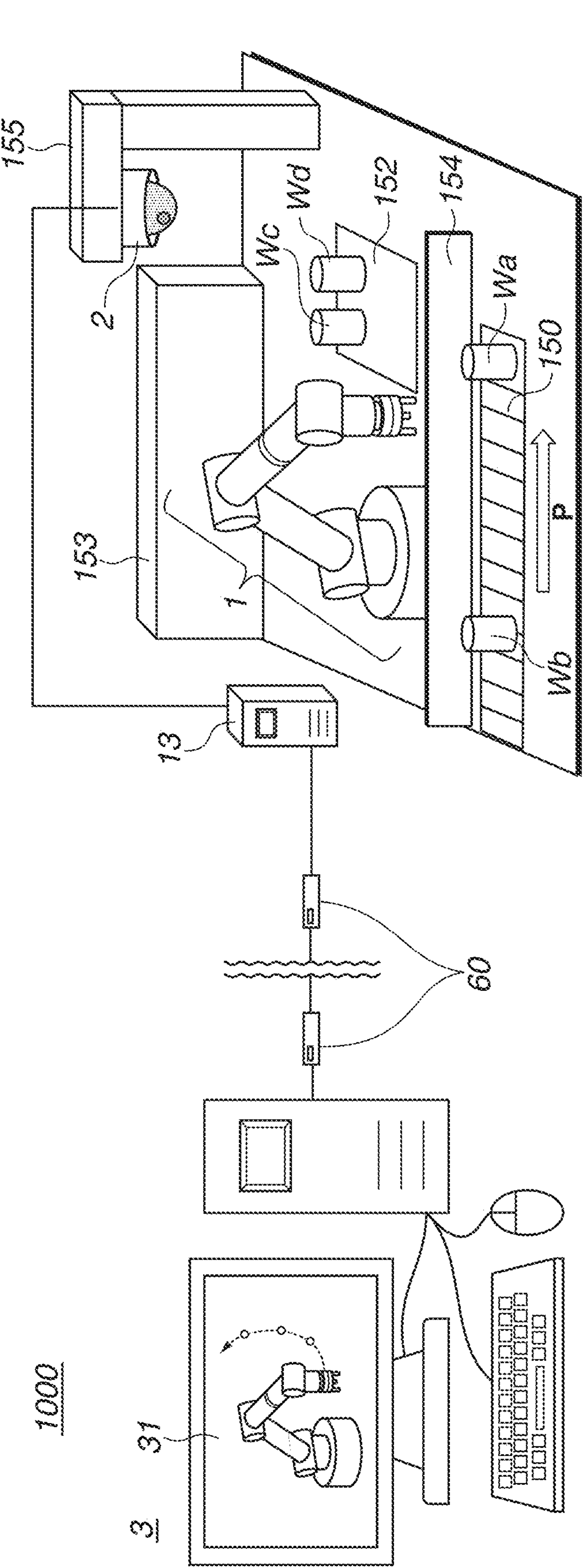
FIG. 1 is a diagram illustrating a configuration of a robot system 1000 according to an exemplary embodiment.

FIG. 1 is a diagram illustrating a schematic configuration of a robot system 1000 according to the present exemplary embodiment. In the present exemplary embodiment, a description will be given using an example of a task that the robot apparatus 1 executes to arrange works Wa to Wd conveyed through a conveyer belt 150 in a direction indicated by an arrow P onto a tray 152.

The robot system 1000 is configured of a robot apparatus 1, an imaging apparatus 2 for imaging a status of the robot apparatus 1, a robot system control apparatus 13 for controlling the robot apparatus 1 and the imaging apparatus 2 and a computer 3 that allows an operator to browse a video image captured by the imaging apparatus 2 from a remote location. The computer 3 and the robot system control apparatus 13 are connected via a communication apparatus 60 in a remotely-communicable state.

Herein, the remote location refers to a place where the operator cannot directly and visually recognize the robot apparatus 1 as an operation target, but can visually recognize the robot apparatus 1 by using the imaging apparatus 2.

As illustrated in FIG. 1, the imaging apparatus 2 is installed on a pole 155, and the imaging apparatus 2 images a movement of the robot apparatus 1 and displays an image of the robot apparatus 1 on a display 31 of the computer 3 installed in the remote location. Further, protection barriers 153 and 154 are arranged in a periphery of the robot apparatus 1. The protection barriers 153 and 154 are arranged for the sake of safety so that works and an operator can be prevented from colliding with the robot apparatus 1.

Figure 2:
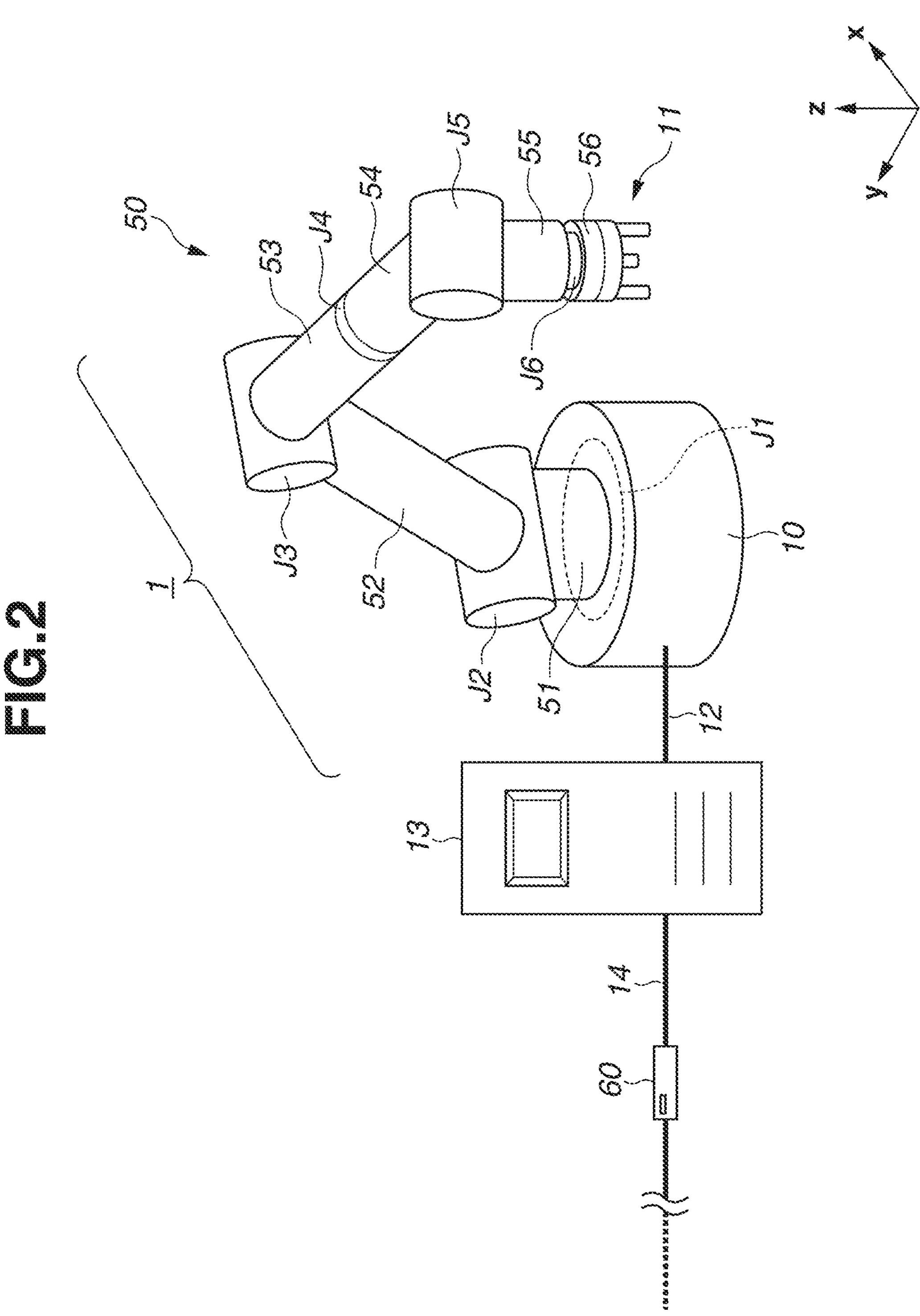
FIG. 2 is a diagram illustrating a configuration of a robot apparatus 1 according to an exemplary embodiment.

FIG. 2 is a diagram illustrating a configuration of the robot apparatus 1 according to the present exemplary embodiment. In the present exemplary embodiment, a six-axis multi-joint robot will be described as an example of the robot apparatus 1.

As illustrated in FIG. 2, the robot apparatus 1 includes a base 10, a robot arm main body 50 having six joints J1 to J6, and an end effector 11 for grasping a work. The robot apparatus 1 is connected to the robot system control apparatus 13 via a cable 12. Further, the robot system control apparatus 13 includes a network card for connection to an external network and is connected to the communication apparatus 60 via a cable 14 to be connected to the external network.

In the present exemplary embodiment, a robot hand having three finger parts will be described as an example of the end effector 11. Although a robot hand having finger parts is given as an example in the present exemplary embodiment, a mechanism capable of executing a task on a work, e.g., an end effector that holds a work with an adsorption mechanism provided instead of the finger parts, may be used separately.

The robot system control apparatus 13 is configured of a central processing unit (CPU) consisting of a microprocessor. An external input device may be connected to the robot system control apparatus 13. For example, a teaching pendant which enables a teacher to directly teach the robot apparatus 1 in the vicinity thereof can be given as an example of the external input device.

The teacher inputs a command value to the robot system control apparatus 13 by using the external input device, and a control value from the robot system control apparatus 13 is transmitted to the robot arm main body 50 and the end effector 11, which causes the robot apparatus 1 to perform an operation such as arrangement of a work on the tray 152. Then, the robot apparatus 1 operates the work to manufacture an article.

The robot system control apparatus 13 includes a read only memory (ROM) which stores a program for controlling a corresponding driving unit depending on various movements of the robot arm main body 50 and data necessary for executing the control. The robot system control apparatus 13 further includes a random access memory (RAM), on which data, a setting value, and a program necessary for controlling the robot arm main body 50 are loaded, and which is also used as a work area of the CPU.

As illustrated in FIG. 2, for example, the robot arm main body 50 is configured of a plurality of links connected to each other via a plurality of joints (six axes) through a serial link method. The links 51, 52, 53, 54, 55, and 56 of the robot arm main body 50 are driven via the joints J1, J2, J3, J4, J5, and J6. Each of the joints includes a motor (not illustrated) serving as a driving source.

As illustrated in FIG. 2, the base 10 and the link 51 of the robot arm main body 50 are connected by the joint J1 rotating about a rotation axis in a Z-axis direction. For example, the joint J1 has a movable range of approximately ±180 degrees from an initial orientation.

The links 51 and 52 of the robot arm main body 50 are connected by the joint J2. A rotation axis of the joint J2 conforms to an X-axis direction in the state illustrated in FIG. 2. For example, the joint J2 has a movable range of approximately ±80 degrees from an initial orientation.

The links 52 and 53 of the robot arm main body 50 are connected by the joint J3. A rotation axis of the joint J3 conforms to the X-axis direction in the state illustrated in FIG. 2. For example, the joint J3 has a movable range of approximately ±70 degrees from an initial orientation.

The links 53 and 54 of the robot arm main body 50 are connected by the joint J4. A rotation axis of the joint J4 conforms to a Y-axis direction in the state illustrated in FIG. 2. For example, the joint J4 has a movable range of approximately ±180 degrees from an initial orientation.

The links 54 and 55 of the robot arm main body 50 are connected by the joint J5. A rotation axis of the joint J5 conforms to the X-axis direction. The joint J5 has a movable range of approximately ±120 degrees from an initial orientation.

The links 55 and 56 of the robot arm main body 50 are connected by the joint J6. A rotation axis of the joint J6 conforms to the Z-axis direction. The joint J6 has a movable range of approximately ±240 degrees from an initial orientation.

Further, a robot hand for executing assembling work or transportation work in a production line is employed as the end effector 11 connected to a leading end of the robot arm main body 50.

The end effector 11 can be attached to the link 56 either by a semi-fixation method such as screwing or by an attaching-detaching method such as latching.

Particularly, in a case where the end effector 11 is detachably mounted, such a method can be considered that the robot arm main body 50 is controlled to attach or replace with another end effector 11 disposed on a supply position through a movement of the robot arm main body 50 itself.

Further, in the present exemplary embodiment, in order to execute feedback control of driving of the joints J1 to J6, a torque sensor and an encoder (not illustrated) are arranged on each of the joints J1 to J6.

Figure 3:
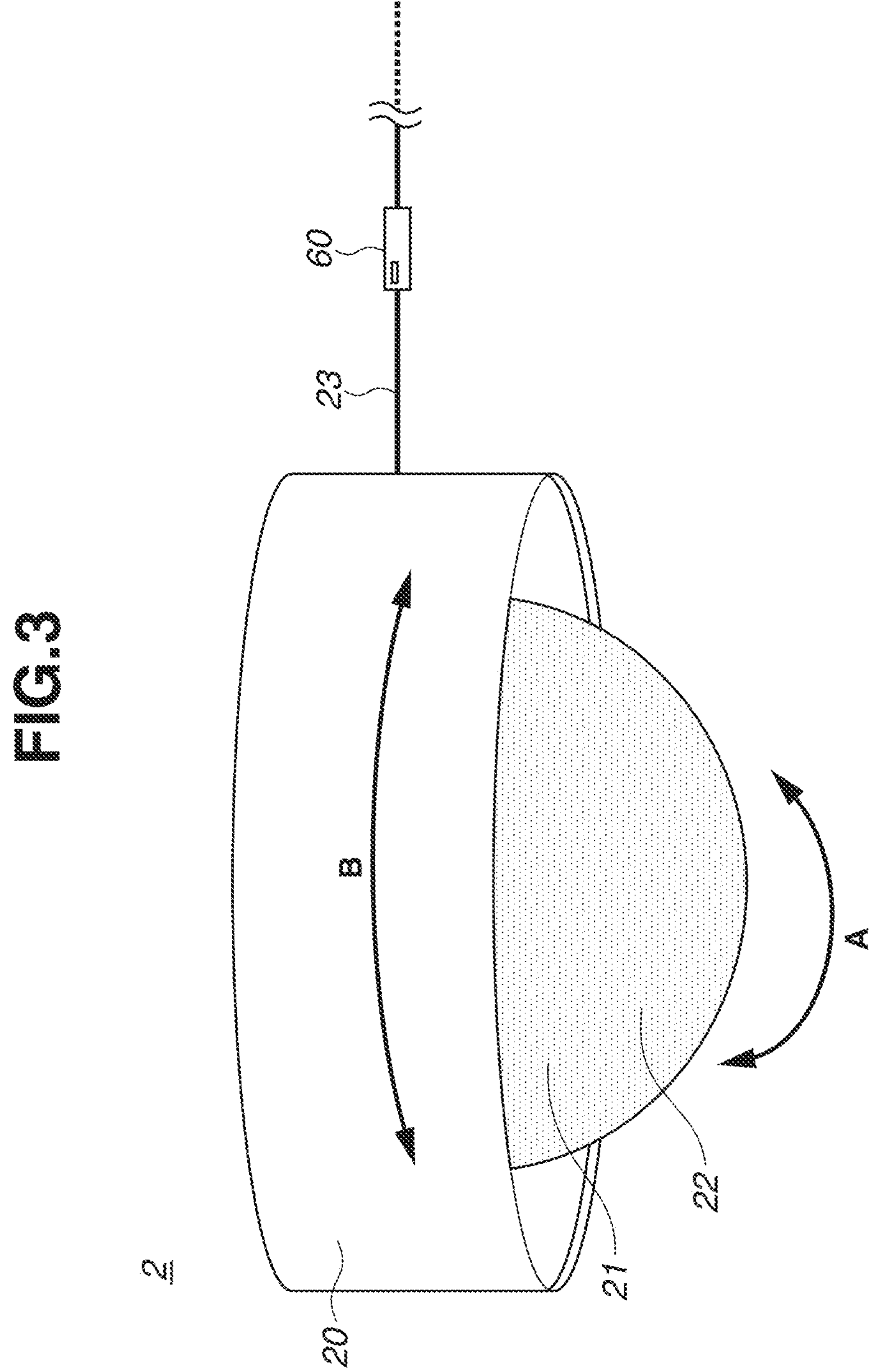
FIG. 3 is a diagram illustrating a configuration of an imaging apparatus 2 according to an exemplary embodiment.

FIG. 3 is a diagram illustrating a configuration of the imaging apparatus 2. In the present exemplary embodiment, an imaging apparatus capable of executing panning, tilting, and zooming will be described as an example.

The imaging apparatus 2 includes a camera base 20, a movable unit 21, and an imaging unit 22 inside the movable unit 21.

The movable unit 21 includes a tilt motor, and the imaging unit 22 is provided therein via a transmission mechanism such as a shaft and a bearing, which enables the imaging unit 22 to rotate in a tilt direction indicated by an arrow A.

Similarly, the movable unit 21 includes a pan motor, and the imaging unit 22 is provided therein via a transmission mechanism such as a shaft and a bearing, which enables the imaging unit 22 to rotate in a pan direction indicated by an arrow B.

Further, the imaging apparatus 2 includes a network card for connection to an external network and is connected to the communication apparatus 60 via a cable 23 to be connected to the external network.

With the above described configuration, the imaging apparatus 2 can image the robot apparatus 1 and a predetermined position in the vicinity thereof by the movable unit 21, so that a captured image can be displayed on the display 31 of the computer 3 in the remote location via the communication apparatus 60.

Figure 4:
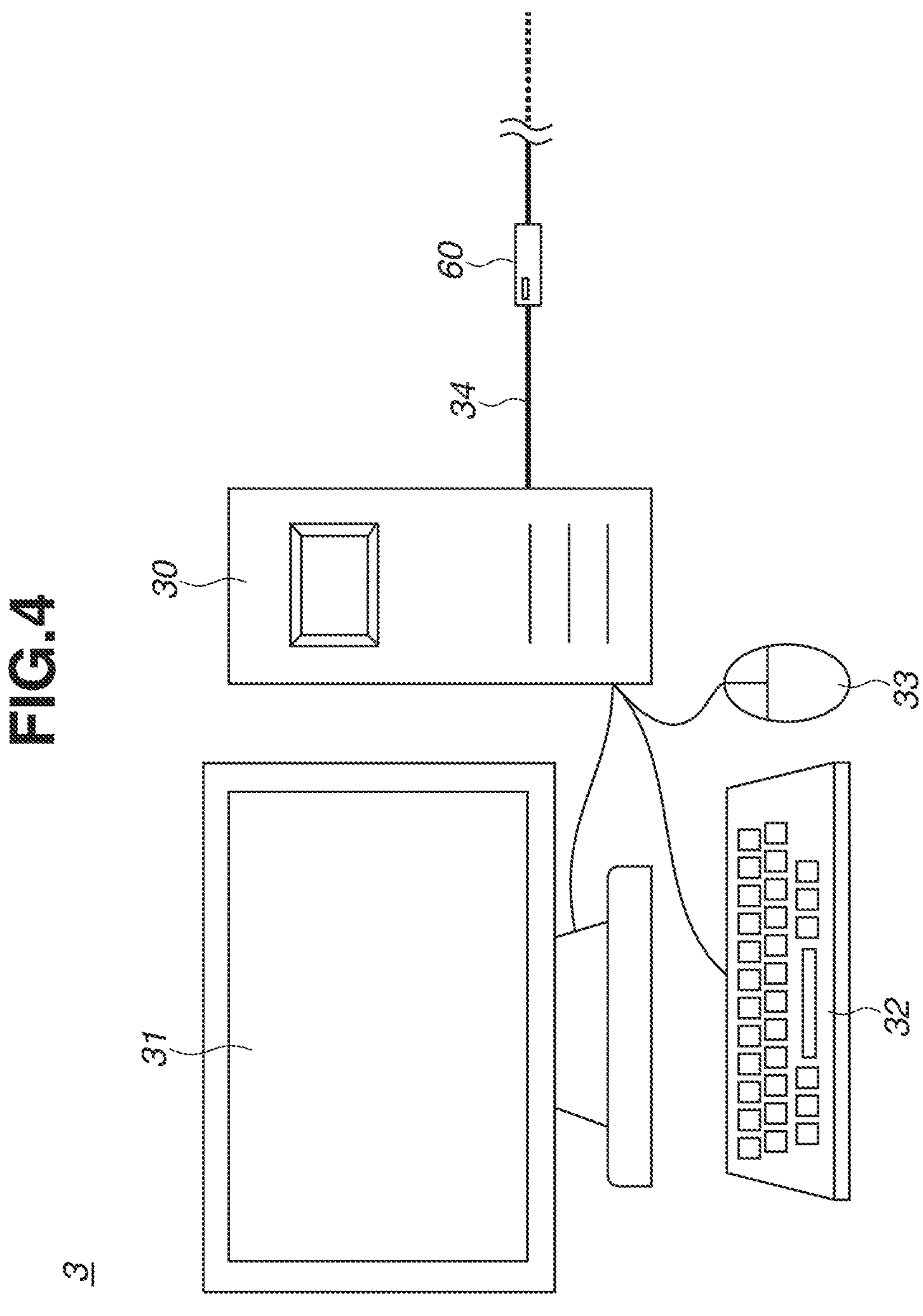
FIG. 4 is a diagram illustrating a configuration of a computer 3 according to an exemplary embodiment.

FIG. 4 is a diagram illustrating the computer 3 which enables an operator to operate the robot apparatus 1 based on a captured image acquired from the imaging apparatus 2. The computer 3 includes an operation system (OS) 30, a display 31, a keyboard 32, and a mouse 33.

An interface for controlling the robot apparatus 1 in a remote location and a captured image imaged by the imaging apparatus 2 are displayed on the display 31.

Further, the OS 30 includes a network card for connection to an external network and is connected to the communication apparatus 60 via a cable 34 to be connected to the external network.

With the above described configuration, the operator can input a command value by using the keyboard 32 and the mouse 33 to operate the robot apparatus 1 and the imaging apparatus 2 from the remote location based on the information displayed on the display 31.

In the present exemplary embodiment, the description has been given using the example in which a task which the robot apparatus 1 executes to arrange the works Wa to Wd conveyed through the conveyer belt 150 in a direction indicated by the arrow P on the tray 152. This operation of the robot apparatus 1 for arranging the works is executed according to an operation program created in advance. In the present exemplary embodiment, this operation is called normal operation.

However, there is a case where the operation of the robot apparatus 1 is stopped because of occurrence of abnormality of some kind. For example, those cases can be considered in which the robot apparatus 1 is urgently stopped because a site operator accesses the vicinity of the robot apparatus 1 and in which some abnormality occurs during the normal operation because a different type of a work has been conveyed on the conveyer belt 150.

At this time, a position where the robot apparatus 1 is stopped is called an abnormal stop position. Generally, in order for the robot apparatus 1 to be restored to the normal operation, the robot apparatus 1 has to be moved to a position specified as an initial starting point in the normal operation. This position is called a restore position, and the operation of the robot apparatus 1 from the abnormal stop position to the restore position is called restoration.

In order to execute the restoration, in the present exemplary embodiment, the operator checks a state of the robot apparatus 1 from the remote location by using the imaging apparatus 2, creates and executes a restoration trajectory of the robot apparatus 1, and monitors the robot apparatus 1 being in operation.

At the time, in order to avoid the robot apparatus 1 from being in contact with any peripheral device, when the operator operates the robot apparatus 1 based on imaging by the imaging apparatus 2, the operator is enabled to perform the above operation while easily confirming the safety without using a follow-up marker. Details will be described below.

Figure 5:
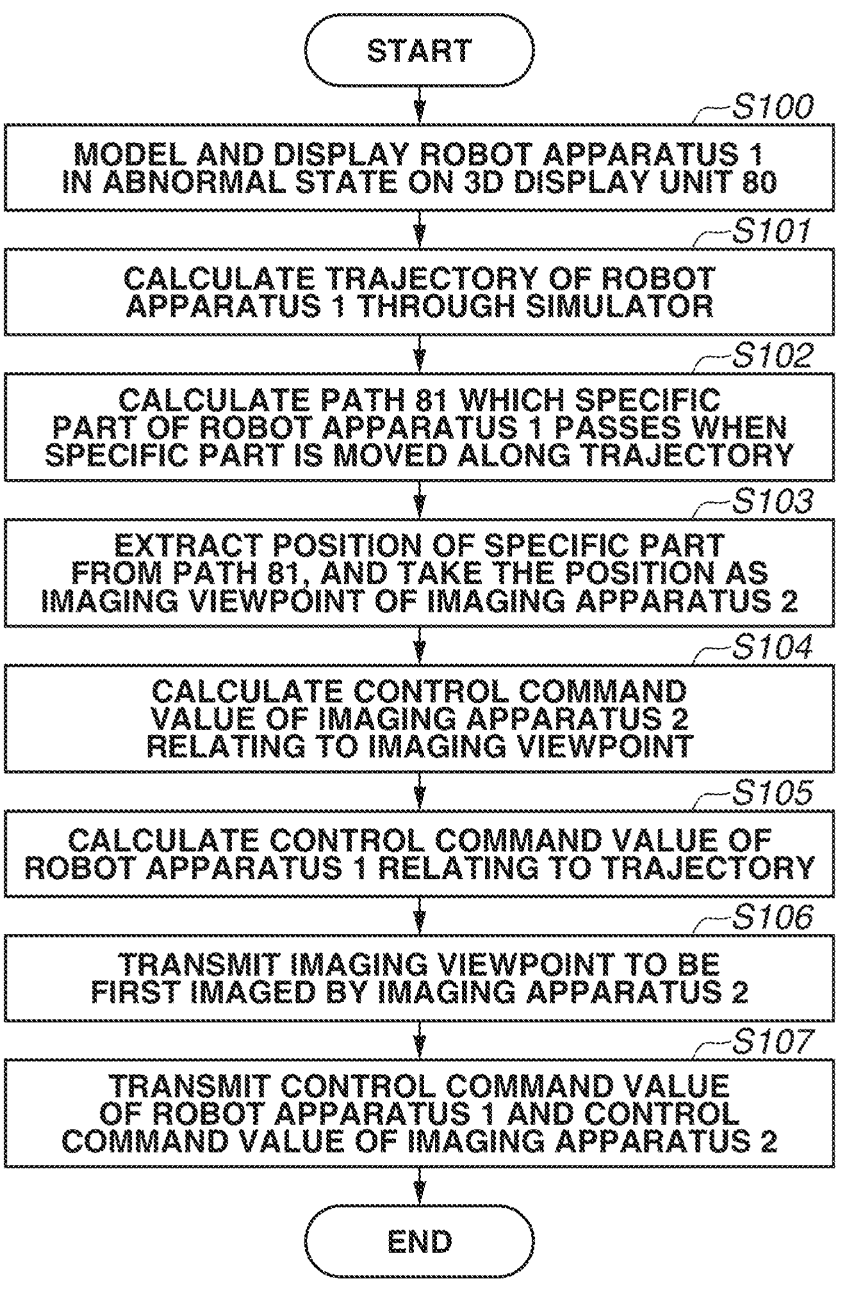
FIG. 5 is a flowchart illustrating a control method according to an exemplary embodiment.

FIG. 5 is a flowchart illustrating a control method of the robot apparatus 1 and the imaging apparatus 2 according to the present exemplary embodiment. The control method consists of eight processing steps S100 to S107. The specific method executed in each of the processing steps will be described below with reference to the diagrams.

First, it is assumed that the robot apparatus 1 is brought into the above-described abnormal state and the processing flow is started in a state the robot apparatus 1 is stopped at the abnormal stop position.

Figure 6A:
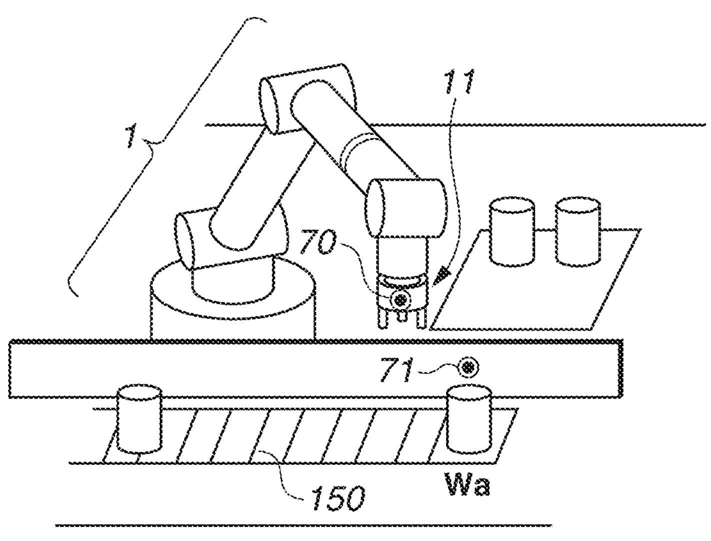
FIG. 6A is a diagram illustrating a state where the robot apparatus 1 according to the exemplary embodiment is stopped abnormally.
Figure 6B:
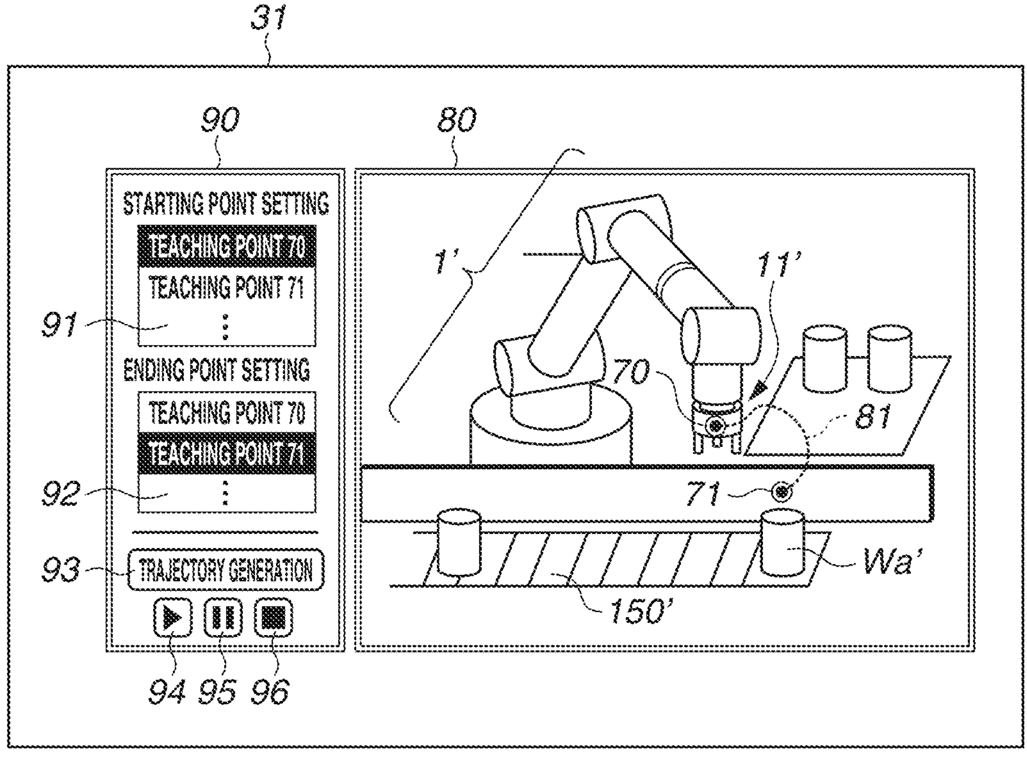
FIG. 6B is a diagram illustrating a state where the robot apparatus 1 according to the exemplary embodiment is stopped abnormally.

FIG. 6A is a diagram illustrating the abnormal stop position and the restore position of the robot apparatus 1 when the robot apparatus 1 that has been in operation is stopped abnormally. FIG. 6B is a diagram illustrating a screen structure of the display 31 of the computer 3 when the operator displays the robot apparatus 1 in an abnormal state in simulation.

FIGS. 6A and 6B illustrate a state where the end effector 11 of the robot apparatus 1 is stopped at an abnormal stop position 70, and the end effector 11 has to be restored to a restore position 71 above the work Wa. In the present exemplary embodiment, the robot system has a function of automatically generating a trajectory of the robot apparatus 1 based on information about a starting point and an ending point.

In FIG. 6B, a 3D model display unit 80 for executing 3D screen display and a trajectory generation display unit 90 for creating a trajectory of the robot apparatus 1 are displayed on the screen of the computer 3.

The actually arranged robot apparatus 1 and work are displayed on the 3D model display unit 80 as 3D model simulation.

The operator can appropriately move movable objects such as the robot apparatus 1 and the conveyer belt 150 by using the keyboard 32 and the mouse 33. For the sake of convenience, a symbol ['] is attached to a reference number of an object displayed on the 3D model display unit 80.

The trajectory generation display unit 90 includes a starting point selection box 91 for setting a starting point and an ending point selection box 92 for setting an ending point. Teaching points created by the operator are displayed inside the starting point selection box 91 and the ending point selection box 92, so that the operator can make a selection.

The trajectory generation display unit 90 further includes a trajectory generation button 93, a trajectory reproducing button 94, a temporary stop button 95, and a stop button 96.

When the operator clicks the trajectory generation button 93, processing for calculating a trajectory of the robot apparatus 1 from a teaching point selected in the starting point selection box 91 to a teaching point selected in the ending point selection box 92 is executed.

The calculation of the trajectory is executed using a technique such as the rapidly-exploring random trees (RRT). When the calculation of the trajectory is ended, the operator can check how the robot apparatus 1 and the end effector 11 are actually moved on the 3D model display unit 80 by clicking the trajectory reproducing button 94.

The trajectory used herein represents displacement values of the respective joints J1 to J6 of the robot apparatus 1 for each control cycle. For example, in a case where the robot apparatus 1 executes a movement that takes time of 2000 ms when the control cycle of the robot apparatus 1 is 4 ms, the trajectory is expressed by a total of 500 sets of displacement values of the joints J1 to J6.

Returning back to FIG. 5, this processing flow is started when the robot apparatus 1 is stopped at the abnormal stop position because of occurrence of abnormality in the robot apparatus 1, and the processing proceeds to step S100.

In step S100, when abnormality has occurred in the actually arranged robot apparatus 1, the robot system control apparatus 13 and the OS 30 communicate with each other, and the robot apparatus 1' on the 3D model display unit 80 is displayed to be in an orientation the same as that of the robot apparatus 1.

At this time, the OS 30 receives detection values of the encoders provided in the joints J1 to J6 of the robot apparatus 1 in the abnormal state from the robot system control apparatus 13, and displays the modeled robot apparatus 1' based on the detection values of the encoders. With this processing, the robot apparatus 1' can be displayed on the 3D model display unit 80 to be in an orientation the same as that of the robot apparatus 1 when abnormality has occurred.

Next, in step S101, based on a predetermined instruction received from the operator in the remote location, a trajectory of the robot apparatus 1 which causes the end effector 11 to be moved from the abnormal stop position to the restore position is created in simulation. Herein, the operator inputs the abnormal stop position 70 as a starting point and the restore position 71 as an ending point.

Then, in step S102, a path of the end effector 11 is calculated based on the trajectory of the robot apparatus 1 calculated in step S101. The path used herein represents transition of a position at which the specific part of the robot apparatus 1 is arranged for each control cycle of the trajectory when the robot apparatus 1 is moved along the trajectory.

In the present exemplary embodiment, the end effector 11 is set as the specific part. When the control cycle of the robot apparatus 1 is 4 ms and the operation of the robot apparatus 1 takes 2000 ms, the end effector 11 is sequentially moved to 500 positions in total based on 2000 ms/4 ms.

Although the end effector 11 is described as an example of the specific part of the robot apparatus 1 in the present exemplary embodiment, a predetermined place such as any one of the joints J1 to J6 of the robot arm main body 50 can be specified as the specific part.

A place selected as a specific part is specified as a position to be imaged by the imaging apparatus 2. Thus, for example, if there is any part of the robot apparatus 1 which is likely to be in contact with the protection barrier 153 or 154, the part can be selected as the specific part.

By solving forward kinematics of the robot based on the trajectory, i.e., displacement of the respective joints J1 to J6 of the robot apparatus 1, a position of the end effector 11 can be calculated, and a path of the end effector 11 can be calculated. The processing in step S102 corresponds to path calculation processing.

When the trajectory of the robot apparatus 1 and the path of the end effector 11 are respectively calculated in steps S101 and S102, a path 81 is displayed on the 3D model display unit 80 (FIG. 6B). In addition, the operator may modify the trajectory of the robot apparatus 1 generated in step S101 while checking the path 81 and the captured image imaged by the imaging apparatus 2.

Next, in step S103, an imaging viewpoint used for controlling the movable unit 21 of the imaging apparatus 2 is calculated. When the imaging apparatus 2 is controlled from the remote location, delay in communication from the remote location to the imaging apparatus 2 has to be taken into consideration. This is because a gap occurs between the movement of the robot apparatus 1 imaged by the imaging apparatus 2 and the movement of the actual robot apparatus 1 actually being in operation. Since the operator in the remote location operates the robot apparatus 1 based on the captured image imaged by the imaging apparatus 2, in a case where the gap has occurred, the operator may execute an unintended operation of the robot apparatus 1, which can cause trouble.

Therefore, in the present exemplary embodiment, an imaging viewpoint is extracted from the path 81 by taking a value of response time taken in communication from the remote location to the imaging apparatus 2 as a cycle. The response time refers to time taken to drive the imaging apparatus 2 based on a command value from a point in time when the teacher in the remote location inputs the command value to the imaging apparatus 2 by the OS 30.

For example, it is assumed that the control cycle of the robot apparatus 1 is 4 ms and time taken to move the end effector 11 in the path 81 is 280 ms. At this time, the end effector 11 is sequentially moved to 70 positions in the path 81 based on 280 ms/4 ms.

However, it is often the case that the response time between the imaging apparatus 2 and the OS 30 in the remote location is greater than the control cycle 4 ms of the robot apparatus 1. For example, it is assumed that the response time between the imaging apparatus 2 and the OS 30 is 40 ms.

According to the above-described calculation, the number of positions of the end effector 11 in the path 81 is 70. Therefore, it will take at least 2800 ms, based on 40 ms×70 to drive the imaging apparatus 2 based on the command values input by the teacher to image all of the positions. Since an operation time of the robot apparatus 1 in the path 81 is 280 ms, there will be a gap between the robot apparatus 1 being imaged by the imaging apparatus 2 and the robot apparatus 1 that is actually being in operation.

Therefore, imaging viewpoints are calculated by dividing the operation time of the end effector 11 in the path 81 by the response time taken in communication between the imaging apparatus 2 and the OS 30.

Because the operation time of the end effector 11 in the path 81 is 280 ms, and the response time taken in communication between the imaging apparatus 2 and the OS 30 is 40 ms, 7 positions of the end effector 11 in the path 81 are extracted based on 280 ms/40 ms to calculate the imaging viewpoints. With this calculation, the operation time of the end effector 11 and the imaging time of the imaging apparatus 2 can approximately match each other, so that the above-described gap can be reduced. The processing in step S103 corresponds to imaging viewpoint calculation processing.

Figure 7:
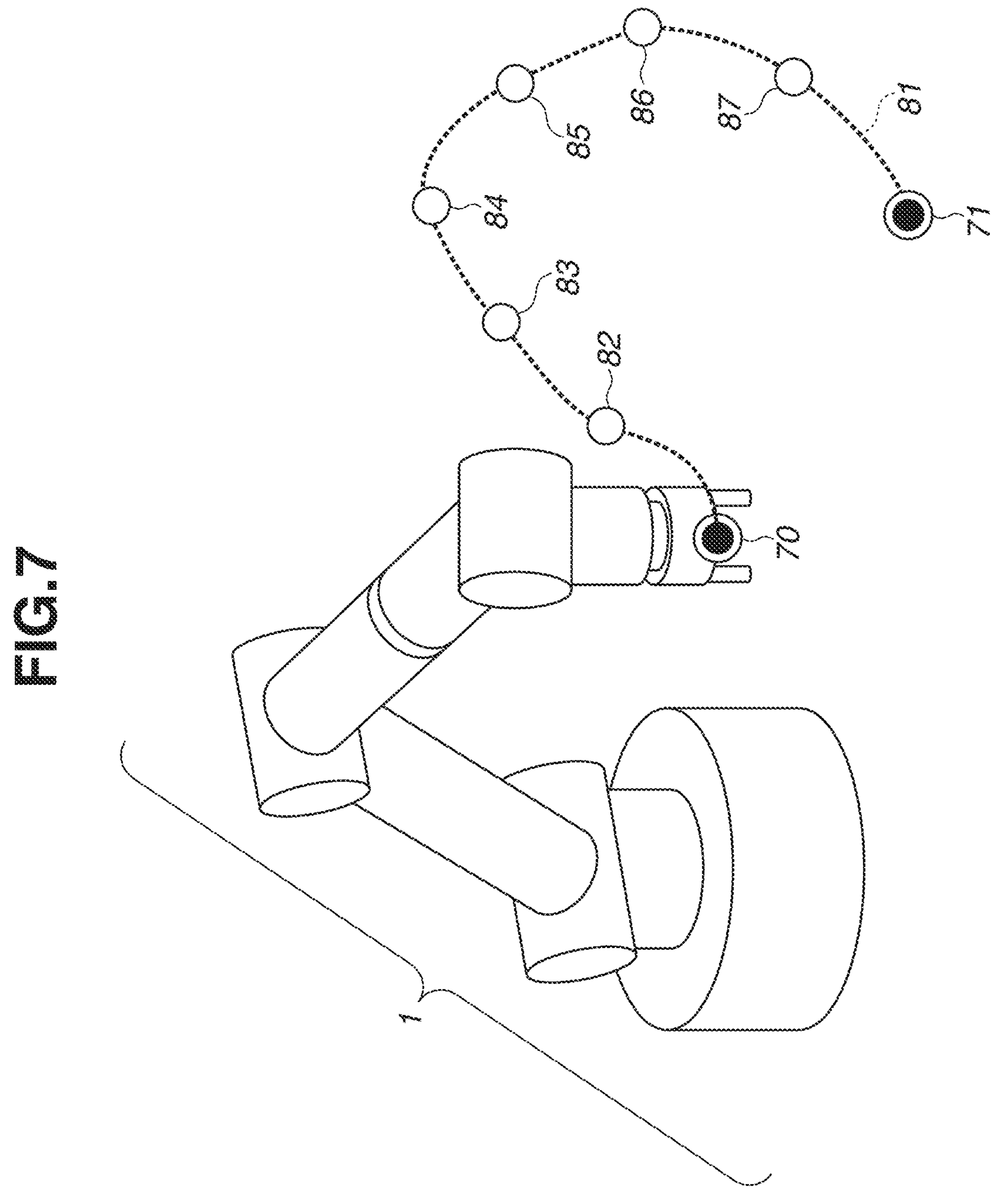
FIG. 7 is a diagram illustrating a calculated path and imaging viewpoints according to an exemplary embodiment.

FIG. 7 is a diagram illustrating a plurality of imaging viewpoints for imaging the path 81 by the imaging apparatus 2. A total of 7 imaging viewpoints including 6 imaging viewpoints 82 to 87 and the restore position 71 are illustrated in the path 81 where the end effector 11 is moved. The number of imaging viewpoints will be 8 in total if the abnormal stop position 70 is also added thereto.

Next, in step S104, a control command value of the imaging apparatus 2 corresponding to each of the imaging viewpoints is calculated. The control command of the imaging apparatus 2 consists of a combination of a rotation amount of the pan motor and a rotation amount of the tilt motor. The above calculation is executed by the OS 30 by using a simulator in which the robot apparatus 1 and peripheral devices are modelled. The pan/tilt rotation amount can be calculated from a relative position relationship between the imaging viewpoint and the imaging apparatus 2. Further, a zoom amount of the imaging apparatus 2 may be adjusted based on a distance between the imaging viewpoint and the imaging apparatus 2.

By transmitting the above-described control command values to the imaging apparatus 2 via the OS 30 and the robot system control apparatus 13, it is possible to move the imaging apparatus 2 to execute imaging at the imaging viewpoints calculated in step S103. In addition, the control command values of the imaging apparatus 2 cannot be transmitted collectively, so that it is necessary to continuously transmit the control command values in order to move the imaging apparatus 2 continuously.

Next, in step S105, control command values of the robot apparatus 1 corresponding to the trajectory acquired in step S102 are calculated. Although the control commands of the robot apparatus 1 can be considered in various forms, in the present exemplary embodiment, displacement values of the joints J1 to J6 for each control cycle, i.e., the trajectory itself, are taken as the control command values of the robot apparatus 1.

By transmitting the control command values to the robot system control apparatus 13, the robot apparatus 1 can be operated from a remote location. Further, the control command values for moving the robot apparatus 1 from the starting point to the ending point can be collectively transmitted in advance.

Next, in step S106, a first imaging viewpoint to be imaged by the imaging unit 22 of the imaging apparatus 2 is set. In the present exemplary embodiment, a position where the robot apparatus 1 is currently stopped abnormally, i.e., the abnormal stop position 70, is set as the first imaging viewpoint.

Lastly, in step S107, the control command values of the imaging apparatus 2 calculated in step S104 and the control command values of the robot apparatus 1 calculated in step S105 are transmitted to the robot system control apparatus 13. Whereas the control command values of the robot apparatus 1 can be transmitted collectively, the control command values of the imaging apparatus 2 cannot be transmitted collectively. Thus, the control command values need to be transmitted for each cycle specified in step S103. With this configuration, the viewpoint of the imaging apparatus 2 can be easily controlled to follow the movement of the robot apparatus 1.

Figure 8:
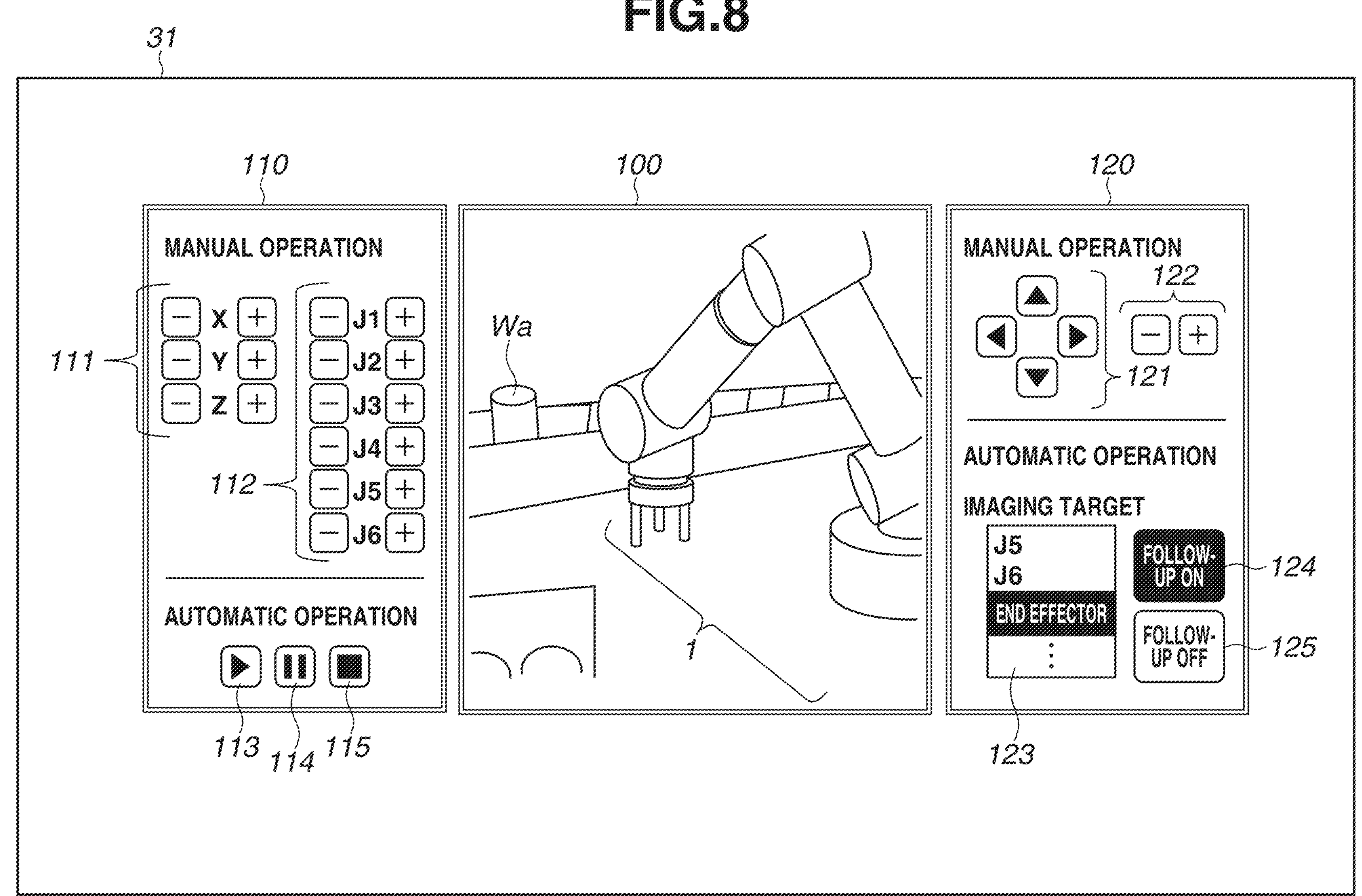
FIG. 8 is a diagram illustrating a screen structure for monitoring the robot apparatus 1 being imaged by the imaging apparatus 2 according to the exemplary embodiment.

FIG. 8 is a diagram illustrating a screen structure of the computer 3 when the operator monitors the movement of the robot apparatus 1. When the processing up to step S107 is ended, the display of the 3D model displayed on the display 31 is switched to a display of a captured image being imaged by the imaging apparatus 2. The display is set such that the operator can switch the display at an optional timing.

As illustrated in FIG. 8, when the movement of the robot apparatus 1 is monitored through the imaging apparatus 2, an imaging display unit 100, a robot apparatus operation unit 110, and an imaging operation unit 120 are displayed on the display 31.

The imaging display unit 100 is a display unit for displaying a captured image being imaged by the imaging apparatus 2, the robot apparatus operation unit 110 is an operation unit for operating the robot apparatus 1, and the imaging operation unit 120 is an operation unit for operating the imaging apparatus 2.

The robot apparatus operation unit 110 consists of two operation portions respectively used for manually and automatically operating the robot apparatus 1.

As a method for manual operation, the robot apparatus operation unit 110 includes end effector operation buttons 111 for moving the end effector 11 of the robot apparatus 1 in the X-Y-Z direction in an optional coordinate system and joint operation buttons 112 for operating the rotation amount of each of the joints J1 to J6.

Further, for the case of executing automatic operation, the robot apparatus operation unit 110 includes an execute button 113 for executing the trajectory calculated in step S101 with the actual robot apparatus 1, a temporary stop button 114, and an emergency stop button 115.

The imaging operation unit 120 also consists of two operation portions respectively used for manually and automatically operating the imaging apparatus 2.

For the case of manual operation, the robot apparatus operation unit 110 includes viewpoint operation buttons 121 for executing pan/tilt operation of the imaging apparatus 2 and zoom operation buttons 122 for executing zoom-in/zoom-out operation.

Further, the imaging operation unit 120 includes an imaging target box 123 for specifying an imaging target of the imaging apparatus 2. Parts relating to the robot apparatus 1 are displayed therein, and the path is calculated in step S102 based on the part selected therefrom.

The operator clicks a follow-up ON button 124 in a case where the operator wants to execute automatic imaging control based on the imaging viewpoints calculated in step S103. The operator clicks a follow-up OFF button 125 in a case where follow-up by the imaging apparatus 2 is not needed.

An operation control method of the viewpoint of the imaging apparatus 2 for following the movement of the robot apparatus 1 according to the present exemplary embodiment has been described above. By setting the follow-up ON button 124 to ON and pressing the execute button 113 for executing automatic operation of the robot apparatus 1, the imaging apparatus 2 can be easily controlled to follow the movement of the robot apparatus 1 without making advance preparations such as arrangement of the follow-up markers. In this way, it is possible to prevent difficulty in controlling the viewpoint of the imaging apparatus 2 caused by the follow-up markers hidden behind the peripheral devices.

Further, when the robot apparatus 1 is actually operated, there may occur an event unexpected by the operator. However, because the viewpoint of the imaging apparatus 2 is automatically controlled to follow the movement of the robot apparatus 1, the operator can concentrate on the operation of the robot apparatus 1. Therefore, even in a case where an unexpected event has occurred, the operator can promptly take measures such as execution of emergency stop operation, so that the robot apparatus 1 can be prevented from being in contact with the peripheral devices.

Further, when imaging viewpoints of the imaging apparatus 2 are set, the imaging viewpoints are calculated by dividing the operation time of the end effector 11 in the path 81 by the response time taken in communication between the imaging apparatus 2 and the OS 30. With this method, the movement time of the end effector 11 and the imaging time of the imaging apparatus 2 can match each other, so that the movement can be prevented from being out of synchronization.

If the imaging apparatus 2 has a field of view sufficient for imaging the end effector 11 and the vicinity thereof to some extent, the imaging viewpoint 82 subsequent to the abnormal stop position 70 may be set as a first imaging viewpoint in step S106. In this way, monitoring of the operation of the robot apparatus 1 can be executed in anticipation, so that contact of a predetermined position of the robot apparatus 1 with the peripheral device caused by the movement of the robot apparatus 1 can be prevented more reliably.

In addition, the anticipated movement may be realized by moving the imaging apparatus 2 based on the imaging viewpoints first and then starting the movement of the robot apparatus 1 in the path 81 at a predetermined timing. Although the end effector 11 is temporarily out of the imaging range of the imaging apparatus 2 at this time, the anticipated movement can be realized by moving the imaging apparatus 2 such that the end effector 11 is positioned within the imaging range again based on the imaging viewpoints.

Figure 9:
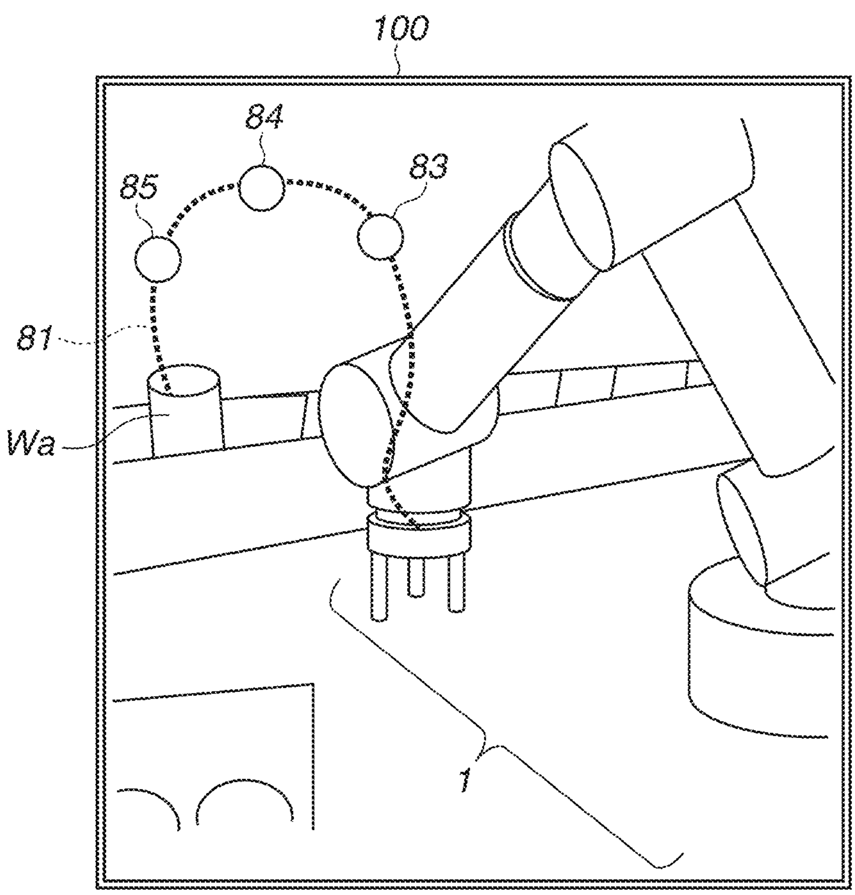
FIG. 9 is a diagram illustrating a variation example of the screen structure for monitoring the robot apparatus 1 being imaged by the imaging apparatus 2 according to the exemplary embodiment.

Further, as illustrated in FIG. 9, the path 81 calculated in step S102 and the imaging viewpoints calculated in step S103 may be displayed on the imaging display unit 100 together with the captured image imaged by the imaging apparatus 2. With this configuration, it is possible to anticipate how the robot apparatus 1 is moved next, thereby preventing the predetermined position of the robot apparatus 1 from being in contact with the peripheral devices.

Although, in the present exemplary embodiment, the 3D model display unit 80 and the imaging display unit 100 are displayed separately, the 3D model display unit 80 and the imaging display unit 100 may be displayed simultaneously. With this configuration, it is possible to confirm a difference in movement between the simulation and the actual apparatus.

The Second Exemplary Embodiment

A control method of the robot system using an imaging apparatus according to a second exemplary embodiment of the present invention will be described with reference to the drawings. In the first exemplary embodiment, a pan-tilt-zoom camera capable of operating a viewpoint through pan-tilt rotation has been described as an example. According to the present exemplary embodiment, a camera capable of imaging the 360-degree surroundings thereof is also preferable. The present exemplary embodiment will be described below in detail.

Hereinafter, configurations of hardware and a control system different from those described in the first exemplary embodiment will be described. Further, it is understood that configurations and effects similar to those described above can be realized by the portions similar to the first exemplary embodiment, so that detailed descriptions thereof will be omitted.

Figure 10:
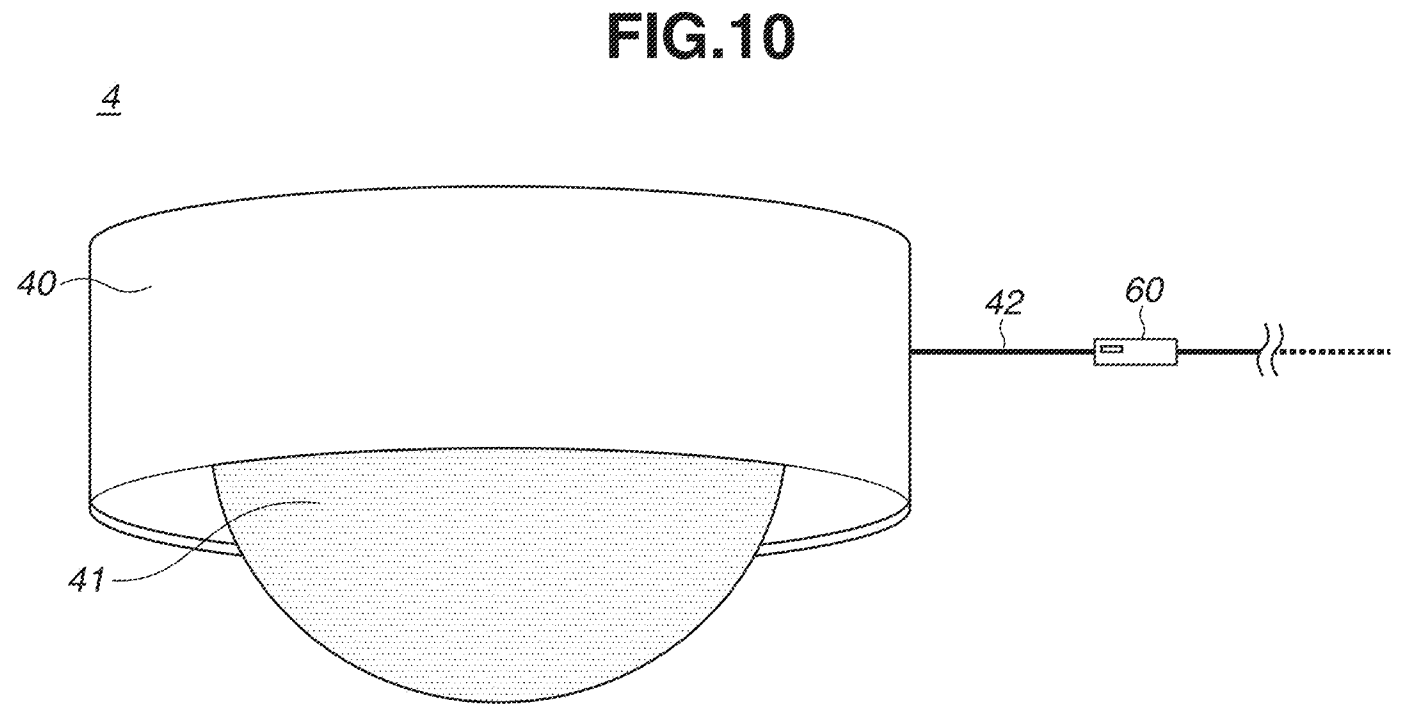

FIG. 10 is a diagram illustrating a configuration of an imaging apparatus 4 according to the present exemplary embodiment. The imaging apparatus 4 is an omnidirectional camera provided with a camera base 40, an imaging unit 41, and a cable 42 used for network connection. The imaging unit 41 can execute imaging in a direction of 360 degrees based on a place where the imaging apparatus 4 is installed. Further, the imaging apparatus 4 includes a network card for connection to an external network and is connected to the communication apparatus 60 via the cable 42 to be connected to the external network.

Although the imaging apparatus 4 of the present exemplary embodiment does not have the mechanism for moving a viewpoint of the imaging unit or the zooming mechanism described in the first exemplary embodiment, the imaging apparatus 4 can execute digital zoom for locally enlarging a part of a captured image. Therefore, the imaging apparatus 4 in the present exemplary embodiment is controlled to execute digital zoom on a position corresponding to the imaging viewpoint, so that a viewpoint can be controlled to follow a target object to be desirable observed.

A control method of the imaging apparatus 4 in the present exemplary embodiment is similar to that of the first exemplary embodiment illustrated in the flowchart of FIG. 5, so that description thereof will be omitted.

Figure 11A:
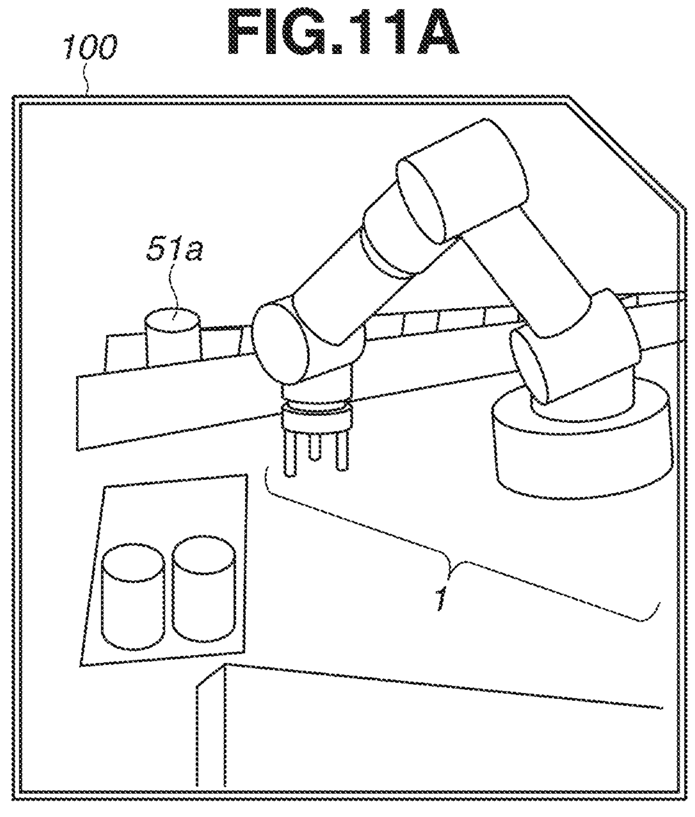
FIG. 11A is a diagram illustrating a screen structure for monitoring the robot apparatus 1 being imaged by the imaging apparatus 4 according to the exemplary embodiment.
Figure 11B:
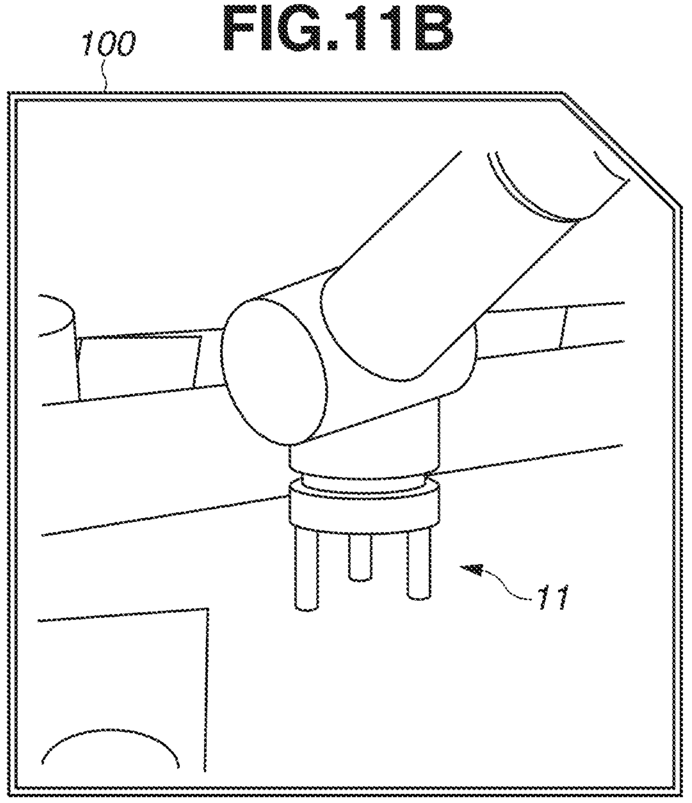
FIG. 11B is a diagram illustrating a screen structure for monitoring the robot apparatus 1 being imaged by the imaging apparatus 4 according to the exemplary embodiment.

FIGS. 11A and 11B illustrates diagrams of the imaging display unit 100 that displays captured images being imaged by the imaging apparatus 4 of the present exemplary embodiment. FIG. 11A illustrates a captured image normally imaged by the imaging apparatus 4. FIG. 11B illustrates a captured image when digital zoom is executed with respect to a position corresponding to the imaging viewpoint calculated in step S103 of the first exemplary embodiment.

As illustrated in FIG. 11B, an effect similar to that of the first exemplary embodiment can be achieved if the imaging apparatus 4 is controlled to execute digital zoom on an imaging viewpoint calculated with consideration for the path of the robot apparatus and a lag in communication with the imaging apparatus. Although, in the pan-tilt-zoom camera, the cost may increase because driving sources such as a pan motor and a tilt motor are needed, cost of the omnidirectional camera can be reduced because no motor is provided thereon.

Further, the imaging viewpoint may be displayed by adjusting a magnification ratio of the image displayed by the imaging apparatus 4 with a lens in addition to the above-described digital zoom based on image processing.

Figure 12:
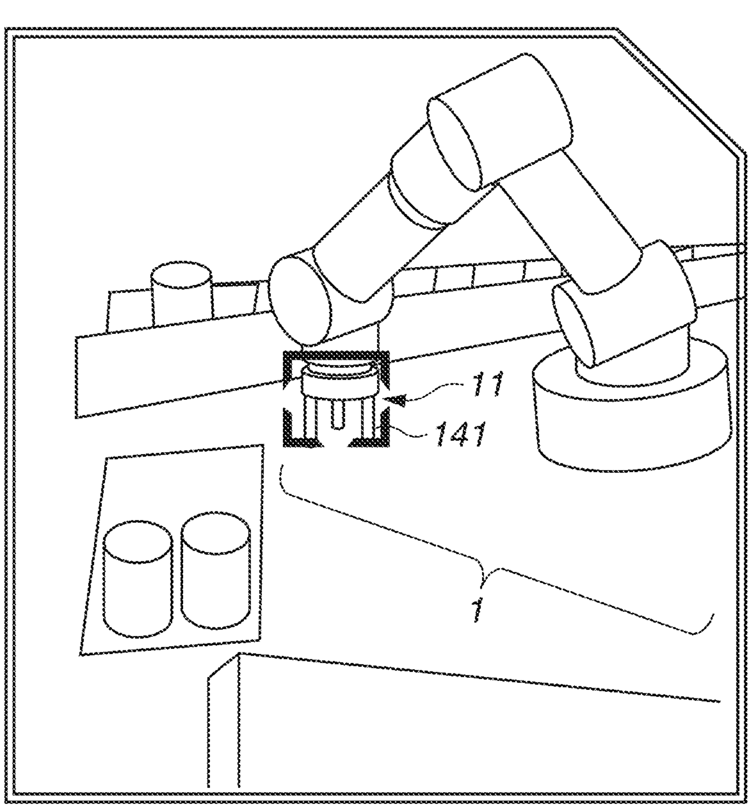
FIG. 12 is a diagram illustrating a screen structure for monitoring the robot apparatus 1 being imaged by the imaging apparatus 2 according to the exemplary embodiment.

Further, as illustrated in FIG. 12, with respect to the position corresponding to the calculated imaging viewpoint, processing for adding a marker on a captured image may be executed. In FIG. 12, a marker 141 is displayed at a position corresponding to the imaging viewpoint in the captured image imaged by the imaging apparatus 4.

By providing a button to be pressed by the operator for automatically executing digital zoom on the marker 141, the operator can closely observe the specific part while viewing the entirety of the robot apparatus 1, so that the movement of the robot apparatus 1 can be easily monitored from a remote location.

Specifically, the processing procedures described in the first and the second exemplary embodiments are executed by the robot system control apparatus 13 and the OS 30. Accordingly, a control program of software capable of executing the above-described functions and a storage medium storing that program constitute the present invention.

Further, in the above-described exemplary embodiments, a ROM or a RAM has been described as a computer readable storage medium, and the control program is stored in the ROM or the RAM; however, the present invention is not limited to these exemplary embodiments. The control program for implementing the present invention may be stored in a storage medium of any type as long as the storage medium is readable by a computer. For example, a hard disk drive (HDD), an external storage device, or a recording disk may be used as a storage medium for supplying the control program. Further, a control unit may be arranged on an imaging apparatus, the above-described control program and trajectory data of the robot apparatus may be stored in that control unit, and the first and the second exemplary embodiments can be implemented by the imaging apparatus alone.

Other Exemplary Embodiments

Although, in the above-described first and the second exemplary embodiments, a six-axis multi-joint robot having six joints has been described as the robot arm main body 50, the number of joints is not limited thereto. Although a vertical multi-axis structure has been described as the form of the robot arm main body 50, a configuration similar to the above-described configuration can be implemented in the joints of the robot arm main body 50 of a different form such as a parallel-link type.

Although a configuration example of the robot arm main body 50 is illustrated in FIG. 2, the configuration is not limited thereto, and the design can be altered arbitrarily by those skilled in the art. Further, the motors of the robot arm main body 50 are not limited to the above-described configurations, and devices such as artificial muscles may be used as the driving sources for driving the respective joins.

Further, although a single imaging apparatus 2 and a single imaging apparatus 4 are described in the first and the second exemplary embodiments, imaging viewpoints may be imaged by using a plurality of imaging apparatuses and cooperatively controlling the plurality of imaging apparatuses.

Further, in the first and the second exemplary embodiments, a screen structure for monitoring the movement of the robot apparatus imaged by the imaging apparatus is displayed on the display 31 of the computer 3 in FIGS. 8, 9, 11, 12, but this is not limitative. For example, the screen structure may be displayed on various interfaces, such as an external input device such as a teaching pendant and a mobile terminal capable of operating the robot apparatus via an application.

The present invention is not limited to the above-described embodiments, and various changes and modifications can be made without departing from the sprit and the scope of the present invention. Accordingly, the following claims are to be attached hereto in order to publicly disclose the scope of the present invention.

According to an aspect of the present invention, based on a path of a target object that an operator wants to observe closely, an imaging apparatus is controlled to continuously execute imaging even if the target object is moved. With this configuration, a viewpoint of the imaging apparatus can be controlled without using a follow-up marker.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A robot system including a robot and an imaging apparatus, the robot system comprising:

a control apparatus configured to control the robot and the imaging apparatus, and wherein the imaging apparatus is arranged at a position where the imaging apparatus is not moved together with a predetermined part of the robot, and wherein the control apparatus obtains, based on a path along which the predetermined part is scheduled to be moved, control data for controlling the imaging apparatus to keep imaging the predetermined part from a position where the imaging apparatus is arranged even if the robot is moved.

2. The robot system according to claim 1, wherein the control apparatus transmits the control data to the imaging apparatus in a communication cycle in communication between the imaging apparatus and the control apparatus.

3. The robot system according to claim 1, wherein the control apparatus obtains the control databased on a simulator in which the robot apparatus is modeled.

4. The robot system according to claim 1, wherein the imaging apparatus includes an imaging unit and a driving unit configured to drive the imaging unit, and wherein the control apparatus obtains the control data based on a driving amount for driving the driving unit to cause the imaging unit to image the predetermined part.

5. The robot system according to claim 4, wherein the imaging apparatus includes a pan motor and a tilt motor as the driving unit, and wherein the driving amount is a rotation amount of the pan motor or a rotation amount of the tilt motor.

6. The robot system according to claim 1, wherein the imaging apparatus includes a zoom function, and wherein the control unit obtains the control data to control the imaging apparatus to image the predetermined part by the zoom function.

7. The robot system according to claim 6, wherein the zoom function is zoom or digital zoom by a lens.

8. The robot system according to claim 1, wherein the imaging apparatus is an omnidirectional camera, and wherein the control apparatus obtains the control data to control the imaging apparatus to image the predetermined part by the omnidirectional camera.

9. The robot system according to claim 1, wherein the control apparatus controls the imaging apparatus to image the predetermined part before the predetermined part is moved based on the control data.

10. The robot system according to claim 1, wherein the control apparatus obtains an imaging viewpoint at which the imaging apparatus images based on the path.

11. The robot system according to claim 10, wherein the control apparatus displays an image imaged by the imaging apparatus and the path or the imaging viewpoint on a display apparatus.

12. The robot system according to claim 11, wherein the control apparatus displays a robot operation unit configured to operate the robot on the display apparatus.

13. The robot system according to claim 11, wherein the control apparatus displays a first operation unit configured to manually operate the robot and a second operation unit configured to automatically operate the robot on the display apparatus.

14. The robot system according to claim 13, wherein the control apparatus displays a button to operate the predetermined part in a triaxial direction and a button to operate a rotation angle of a joint of the robot as the first operation unit on the display apparatus, and wherein the control apparatus displays an execution button to execute automatic operation of the robot, a temporary stop button, and an emergency stop button as the second operation unit on the display apparatus.

15. The robot system according to claim 11, wherein the control apparatus displays an imaging apparatus operation unit configured to operate the imaging apparatus on the display apparatus.

16. The robot system according to claim 11, wherein the control apparatus displays a first operation unit configured to manually operate the imaging apparatus and a second operation unit configured to automatically operate the imaging apparatus on the display apparatus.

17. The robot system according to claim 16, wherein the control apparatus displays a button to operate the imaging apparatus in a pan direction, a button to operate the imaging apparatus in a tilt direction, and a button to set zoom of the imaging apparatus as the first operation unit on the display apparatus, and wherein the control apparatus displays a button to turn on a mode for controlling an operation of the imaging apparatus to image the predetermined part even if the robot is moved based on the control data as the second operation unit on the display apparatus.

18. The robot system according to claim 11, wherein the control apparatus displays a setting screen to set the predetermined part by a user on the display apparatus.

19. The robot system according to claim 11, wherein the control apparatus obtains the path using a simulator, and wherein the control apparatus switches an image imaged by the imaging apparatus and an image by the simulator.

20. The robot system according to claim 11, wherein the control apparatus displays a plurality of points as the imaging viewpoints on the image imaged by the imaging apparatus on the display apparatus.

21. The robot system according to claim 11, wherein the control apparatus displays the imaging viewpoint on the display apparatus by controlling a zoom magnification ratio of the image imaged by the imaging apparatus.

22. The robot system according to claim 11, wherein the control apparatus displays one marker as the imaging viewpoint on the image imaged by the imaging apparatus on the display apparatus.

23. The robot system according to claim 10, wherein a number of the imaging viewpoints is obtained by dividing a time for the predetermined part to be moved along the path by a response time of the imaging apparatus.

24. The robot system according to claim 1, wherein the imaging apparatus is connected to a network and operable via the network.

25. The robot system according to claim 1, wherein the control apparatus obtains the path based on a first position where the predetermined part is located and a second position where the predetermined part is located after the first position.

26. The robot system according to claim 25, wherein the control apparatus receives input of the first position and the second position by a user.

27. The robot system according to claim 1, wherein the control apparatus obtains, based on the path along which the predetermined part is moved, the control data for controlling the imaging apparatus to image the predetermined part and a part of a surrounding environment where the robot is arranged from the position where the imaging apparatus is arranged even if the robot is moved.

28. A method of manufacturing an article using a robot system including a robot and an imaging apparatus, the robot system comprising a control apparatus configured to control the robot and the imaging apparatus, wherein the imaging apparatus is arranged at a position where the imaging apparatus is not moved together with a predetermined part of the robot, and wherein the control apparatus obtains, based on a path along which the predetermined part is scheduled to be moved, control data for controlling the imaging apparatus to keep imaging the predetermined part from a position where the imaging apparatus is arranged even if the robot is moved, the method comprising:

manufacturing an article by causing the predetermined part to execute any one of assembly, transportation, and painting while causing the imaging apparatus to image the predetermined part based on the control data.

29. A control method of a robot system including a robot and an imaging apparatus, wherein the robot system includes a control apparatus configured to control the robot and the imaging apparatus, wherein the imaging apparatus is arranged at a position where the imaging apparatus is not moved together with a predetermined part of the robot, and wherein the control apparatus obtains, based on a path along which the predetermined part is scheduled to be moved, control data for controlling the imaging apparatus to keep imaging the predetermined part from a position where the imaging apparatus is arranged even if the robot is moved.

30. A control apparatus configured to control a robot system including a robot and an imaging apparatus, wherein the imaging apparatus is arranged at a position where the imaging apparatus is not moved together with a predetermined part of the robot, and wherein the control apparatus obtains, based on a path along which the predetermined part is scheduled to be moved, control data for controlling the imaging apparatus to keep imaging the predetermined part from a position where the imaging apparatus is arranged even if the robot is moved.

31. An operation apparatus configured to operate a robot system including a robot and an imaging apparatus, wherein the imaging apparatus is arranged at a position where the imaging apparatus is not moved together with a predetermined part of the robot, and wherein, based on a path along which the predetermined part is scheduled to be moved, control data for controlling the imaging apparatus to keep imaging the predetermined part from a position where the imaging apparatus is arranged even if the robot is moved is obtained.

32. A control method of an operation apparatus configured to operate a robot system including a robot and an imaging apparatus, wherein the imaging apparatus is arranged at a position where the imaging apparatus is not moved together with a predetermined part of the robot, and wherein, based on a path along which the predetermined part is scheduled to be moved, control data for controlling the imaging apparatus to keep imaging the predetermined part from a position where the imaging apparatus is arranged even if the robot is moved is obtained.

33. An imaging apparatus configured to image a robot, wherein the imaging apparatus is arranged at a position where the imaging apparatus is not moved together with a predetermined part of the robot, and wherein, based on a path along which the predetermined part is scheduled to be moved, control data for controlling the imaging apparatus to keep imaging the predetermined part from a position where the imaging apparatus is arranged even if the robot is moved is obtained.

34. A control method of an imaging apparatus configured to image a robot, wherein the imaging apparatus is arranged at a position where the imaging apparatus is not moved together with a predetermined part of the robot, and wherein, based on a path along which the predetermined part is scheduled to be moved, control data for controlling the imaging apparatus to keep imaging the predetermined part from a position where the imaging apparatus is arranged even if the robot is moved is obtained.

35. A non-transitory computer-readable storage medium storing a control program for executing a control method of a robot system including a robot and an imaging apparatus, wherein the robot system includes a control apparatus configured to control the robot and the imaging apparatus, wherein the imaging apparatus is arranged at a position where the imaging apparatus is not moved together with a predetermined part of the robot, and wherein, based on a path along which the predetermined part is scheduled to be moved, a process of obtaining control data for controlling the imaging apparatus to keep imaging the predetermined part from a position where the imaging apparatus is arranged even if the robot is moved is executed.

* * * * *